(12) United States Patent
Ishii et al.

(10) Patent No.: US 6,718,122 B1
(45) Date of Patent: *Apr. 6, 2004

(54) IMAGE PROCESSING APPARATUS

(75) Inventors: Yoshiki Ishii, Yokohama (JP); Makoto Shimokoriyama, Kawasaki (JP); Tetsuya Shimizu, Yokohama (JP); Katsumi Karasawa, Chofu (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 37 days.

(21) Appl. No.: 08/321,597

(22) Filed: Oct. 12, 1994

Related U.S. Application Data

(63) Continuation of application No. 07/822,212, filed on Jan. 17, 1992, now abandoned.

(30) Foreign Application Priority Data

| Jan. 18, 1991 | (JP) | ............................................. 3-004317 |
| Jan. 18, 1991 | (JP) | ............................................. 3-004318 |
| Jan. 18, 1991 | (JP) | ............................................. 3-004319 |

(51) Int. Cl.⁷ .............................................. H04N 5/91
(52) U.S. Cl. ...................................... 386/112; 386/131
(58) Field of Search .............................. 358/335, 341, 358/343; 360/33.1, 35.1, 19.1; 369/32; 348/552; 386/46, 52, 101, 112, 124, 131

(56) References Cited

U.S. PATENT DOCUMENTS 4,303,948 A * 12/1981 Arai et al. .................. 348/552
4,506,342 A * 3/1985 Yamamoto .................. 360/72.2
4,544,956 A * 10/1985 Shimizu ...................... 358/296

(List continued on next page.)

FOREIGN PATENT DOCUMENTS

JP        63-211019        9/1988    ............. G06F/5/00

OTHER PUBLICATIONS

Patent Abstracts of Japan, vol. 13, No. 001 (P–808) (Kokai 63–211019) (9/88).
Yamamitsu et al., "An experimental Study For A Home–Use Digital VTR", in IEEE Transactions on Consumer Electronics, vol. 35, No. 3, pp. 450–457 (8/89).
"An Experimental Study For a Home–Use Digital VTR", IEEE Transactions On Consumer Electronics, vol. 35, No. 3, Aug. 1989, New York, pp. 450–457, Yamamitsu et al.

*Primary Examiner*—Huy Nguyen
(74) *Attorney, Agent, or Firm*—Fitzpatrick, Cella, Harper & Scinto

(57) ABSTRACT

An object of the present invention is to provide a digital VTR wherein, without increasing a transmission rate of an image memory and a data bus corrected thereto, a double error correction coding and decoding process can be achieved. In order to achieve the object, an input and output memory 240 for storing an image data according to an input and an output formats, and a recording and reproducing memory 250 for storing the image according to an image format are provided. To the input and output memory 240, via an input and output bus 234, an input and output circuits 232 and 238 is corrected. In data transmission between the input output memory 240 and the recording and reproducing memory 250, a format conversion, and coding and decoding of an external code are performed. To the recording and reproducing memory 250, via recording and reproducing bus 252, inner coding and decoding circuits 254A and 254B are corrected.

18 Claims, 12 Drawing Sheets

U.S. PATENT DOCUMENTS

| | | | |
|---|---|---|---|
| 4,658,299 A * | 4/1987 | Tanaka et al. | 358/335 |
| 4,757,390 A * | 7/1988 | Mehrgardt et al. | 358/310 |
| 4,794,464 A * | 12/1988 | Sasson | 358/310 |
| 4,860,109 A * | 8/1989 | Kawakami et al. | 358/400 |
| 4,897,799 A * | 1/1990 | Le Gall et al. | 358/400 |
| 4,953,019 A | 8/1990 | Skikakura et al. | 358/133 |
| 4,974,178 A * | 11/1990 | Izeki et al. | 360/14.1 |
| 4,979,187 A | 12/1990 | Aoki et al. | 375/27 |
| 5,022,090 A * | 6/1991 | Masaki et al. | 358/448 |
| 5,051,799 A * | 9/1991 | Paul et al. | 381/168 |
| 5,060,077 A * | 10/1991 | Koya et al. | 358/335 |
| 5,067,010 A | 11/1991 | Ishii et al. | 358/13 |
| 5,093,798 A * | 3/1992 | Kita | 345/641 |
| 5,136,396 A * | 8/1992 | Kato et al. | 358/426 |
| 5,138,503 A * | 8/1992 | Nishida | 358/311 |
| 5,164,839 A * | 11/1992 | Lang | 358/335 |
| 5,371,602 A * | 12/1994 | Tsuboi et al. | 358/335 |
| 5,379,380 A * | 1/1995 | Mori et al. | 358/335 |
| 5,930,453 A * | 7/1999 | Shimizu et al. | 386/131 |

\* cited by examiner

BASIC FORMAT

RECORDING FORMAT

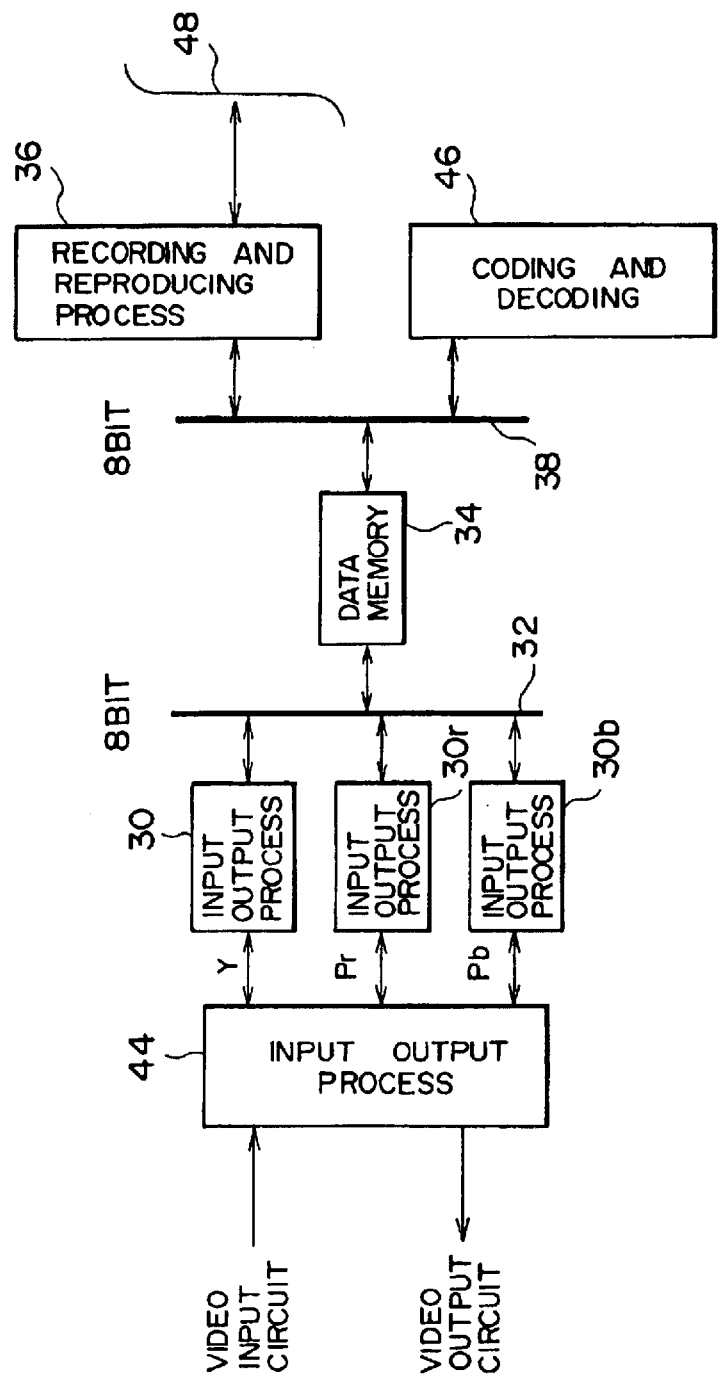

DISPLAY FORMAT

INNER CODE DIRECTION
(DATA TRANSMISSION DIRECTION)
RECORDING FORMAT

IMAGE PROCESSING APPARATUS

This application is a continuation of application Ser. No. 07/822,212 filed Jan. 17, 1992, abandoned.

BACKGROUND OF THE INVENTION

1. Field of the Invention

The present invention relates to an image processing apparatus capable of digital data format conversion between a first format, for example for image display, and a second format, for example for recording on a recording medium.

2. Related Background Art

There are recently developed apparatus capable of transmission or recording/reproduction of image data in digital form, thereby realizing image transmission without deterioration in S/N ratio, or image recording and reproduction without time-dependent deterioration. Such digital image processing apparatus is usually equipped with a data memory capable of storing at least one frame of image data to be handled or processed. The image data may be handled in various formats, such as a display format (or standard input/output format) in which the pixel signals (and image synchronization signals) are aligned in the sequence along the scanning direction, as in the output signals for a monitor or in the input signals from a camera, a recording format for a magnetic recording medium, or a transmission format according to the protocol specific to each communication channel. In the transmission or recording of an image, the data are shuffled and subjected to the addition of error correction codes. Also there are added a synchronization code SYNC and an identification code ID to each data block. FIG. 2(A) illustrates a basic format in which the pixel data are arranged in the order of horizontal and vertical scannings, and FIG. 2B illustrates a recording format on a magnetic tape in a digital VCR. The basic format shown in FIG. 2A corresponds to the horizontal and vertical scans in an image monitor.

Also the digital image processing apparatus is usually equipped with a data memory for temporarily storing the image data to be processed. Conventional digital image processing apparatus employs a circuit structure in which various circuit blocks such as input/output circuit, record/reproducing circuit, data memory etc. are combined through a bus, in order to enable common use of the data memory, thereby reducing the magnitude of hardware. A typical example of such digital image processing apparatus is the digital video cassette recorder (VCR).

FIG. 5 is a block diagram showing the basic structure of a conventional digital VCR, in which shown are an input/output terminal 10 to be connected to a transmission channel such as a public telephone network or a digital network, a television camera, an image monitor or a transmission interface; an input/output circuit 12 composed of an A/D converter, a D/A converter, an interface circuit etc.; a record/reproducing circuit 14 for effecting digital, recording of the image data on a magnetic tape 16 and reproduction of the signal recording on said magnetic tape 16; an encoding/decoding circuit 18 for effecting error correction encoding and decoding related to recording/reproduction; a data memory 20 utilized in the recording and reproduction by the record/reproducing circuit 14; error correction encoding and decoding by the encoding/decoding circuit 18, and input/output process by the input/output circuit 12; and a data bus for mutually connecting the circuits 12, 14, 18 and 20. The data flow in the above-explained configuration is shown in FIG. 6.

The above-explained conventional configuration is incapable, as will be apparent from FIG. 7, of effecting the writing and reading of the data memory through a same data bus at the same time, and is therefore associated with a drawback of a high access rate of the data bus and the data memory because of frequency writing and reading operations. In particular, a higher processing speed is required in case of real-time processing of the video signal.

Besides, if the writing and reading of a same data memory are conducted with different formats, such as the basic format and the recording format, there is inevitably required complex administration or control for said data memory. For simplifying such administration or control, an address generating circuit corresponding to the employed format has to be provided for each of the circuits connected to the data bus, so that the magnitude of the circuitry becomes inevitably large.

Furthermore, a configuration in which a data memory is commonly used through one or two data buses as in the conventional structure explained above, is associated with a drawback of an elevated access rate of the data bus and the data memory and an increased burden on the hardware, if there is required an image processing with a sequence of pixels different from that in the recording format or in the display (or transmission) format, for example encoding and decoding of the image data.

In addition, in recent years, the requirement for higher image quality necessitates a larger amount of data to be processed, and a faster data processing in the system is longed for because of an increase in the sampling rate.

SUMMARY OF THE INVENTION

An object of the present invention is to provide an image processing apparatus capable of individually or collectively resolving the drawbacks mentioned above.

Another object of the present invention is to provide an image processing apparatus capable of high-speed image processing.

Still another object of the present invention is to provide an image processing apparatus capable of data conversion into an image transmission format different from the image transmission format of a given image signal.

The above-mentioned objects can be attained, according to a preferred embodiment of the present invention, by an image processing apparatus comprising a first memory for storing data according to a first transmission format; a second memory for storing data according to a second transmission format different from said first transmission format; transfer control means for applying, at least in the data transfer from said first memory to said second memory, a predetermined process on the data read from said first memory; an input/output means connected with said first memory through a bus and adapted for effecting data input/output with an external equipment; and transmission means connected with said second memory through a bus and adapted for effecting data transmission.

Still another object of the present invention is to provide an image processing apparatus adapted for transferring image data in encoded form.

Still another object of the present invention is to provide an image processing apparatus adapted for use in a digital image recording apparatus.

Still another object of the present invention is to provide an image processing apparatus adapted for ADCT encoding.

Still other objects of the present invention, and the advantages thereof, will become fully apparent from the following description of embodiments, which is to be taken in conjunction with the attached drawings.

BRIEF DESCRIPTION OF THE DRAWINGS

FIG. 3 is d schematic block diagram of a digital VCR incorporating the embodiment shown in FIG. 1;

DESCRIPTION OF THE PREFERRED EMBODIMENTS

1st Embodiment

Figure 1:
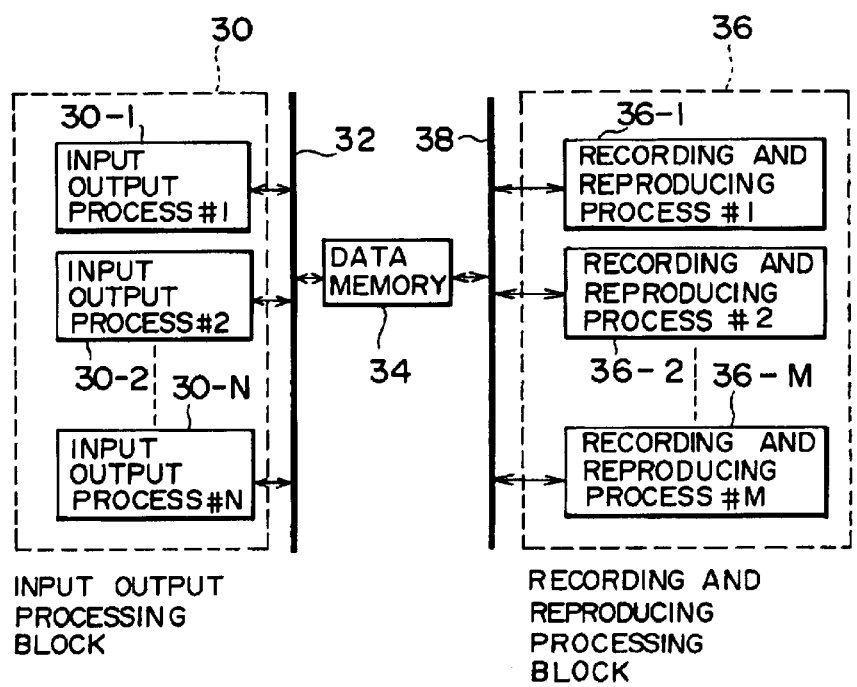
FIG. 1 is a block diagram showing the basic structure of a first embodiment of the present invention.

FIG. 1 is a block diagram showing the basic configuration of an embodiment of the present invention, applied to a digital video cassette recorder. An input/output process block 30 is composed of at least one circuit 30-1, 30-2, ..., 30-N for image data processing in the basic format, in which said circuit 30-1, 30-2, ..., 30-N are connected to a data memory through a common data bus 32. Thus said block 30 can write data into or read data from the data memory 34 through the data bus 32, in the sequence of the image data of the input/output format.

A recording/reproducing process block 36 is composed of at least one circuit 36-1, 36-2, 36-M for image data recording and reproduction in the recording format, and is connected to the data memory through a data bus 38. Thus said block 36 can write data into and read data from the data memory 34 through the data bus 38, in the sequence of data of the recording format.

FIG. 3 is a block diagram showing the basic configuration of a digital VCR in which the embodiment shown in FIG. 1 is applied, wherein same components as those in FIG. 1 are represented by same numbers. An input/output process circuit 44 is adapted to convert an input video signal into a luminance signal Y and color signals Pr, Pb, and to convert input Y, Pb, Pr signals for example into a signal suitable for monitor display. Another input/output process circuit processes the luminance signal Y, while other input/output process circuits 30r, 30b respectively process the color signals Pr, Pb. There are also shown an error correction encoding/decoding circuit 46 for correcting the errors involved in the recording and reproduction, and a magnetic tape 48 constituting a recording medium.

At the recording, the luminance signal and color signals in analog form, supplied from the input/output process circuit 44, are converted into digital form and encoded respectively by the input/output process circuits 30, 30r, 30b. The digital output signals of said circuits are recorded in the data memory 34 through the data bus 32, in the sequence of the basic format. At the recording in the data memory 34, data shuffling is executed if required.

The encoding/decoding circuit 46 makes access to the data memory 34 through the data bus 38, and effects error correction encoding on said data memory 34. After said error correction encoding, the recording/reproduction process circuit 36 reads the data from the data memory in the data sequence of recording format, then adds a synchronization code SYNC and an identification code ID, effects predetermined modulation and records the data on the magnetic tape 48.

Figure 4:
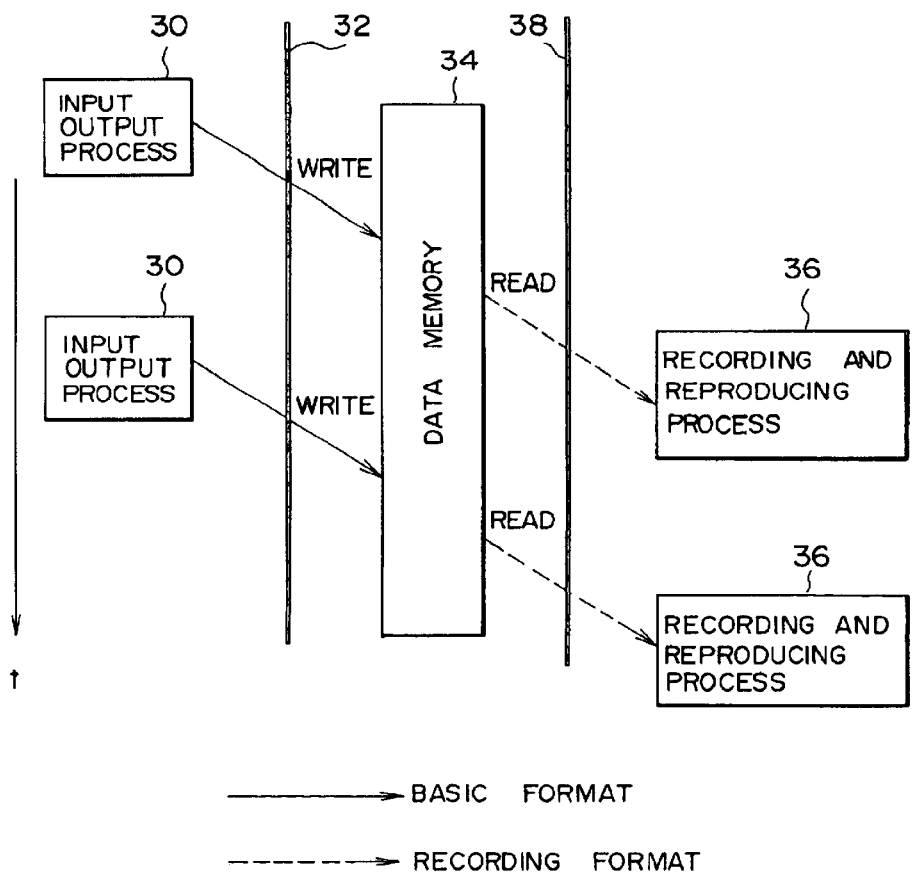
FIG. 4 is a view showing the data flow in a recording operation of the digital VCR shown in FIG. 3.
Figure 5:
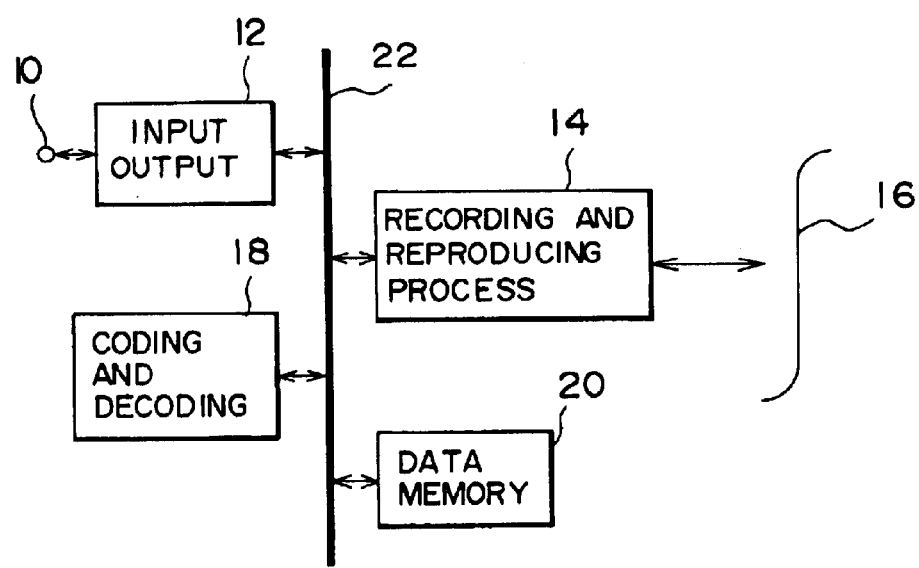
FIG. 5 is a block diagram of a conventional configuration.

FIG. 4 shows the format of the data from the input/output process circuits 30, 30r, 30b through the data bus 32 to the data memory 34 and that from the data memory 34 through the data bus 38 to the record/reproduction process circuit 36 in relation to time t. In the present embodiment, the input/output process circuit 30 and the circuits 30r, 30b have different data input/output rates according to the difference in signal bandwidth, in order to facilitate the data writing into the memory through the data bus 32.

The reproducing operation is conducted in the following manner. The record/reproducing process circuit 36 effects a reproduction process, according to the recording format, on the data reproduced from the magnetic tape 46, and, according to the synchronization code SYNC and identification code ID of said data, writes the reproduced data into the data memory 34 through the data bus 38. The encoding/decoding circuit 46 makes access to the data memory 34 through the data bus 38 and effects error correction on the data memory 34, by the error correction code applied at the recording. If the data shuffling is conducted at the recording, a deshuffling is conducted on the data memory 34 by address handling. Subsequently the image data, stored in the data memory 34, are read to the data bus 32 in the data sequence of the basic format, then converted into an analog signal by the input/output circuit 30 and released through the input/output circuit 44 to an external monitor or the like.

Figure 6:
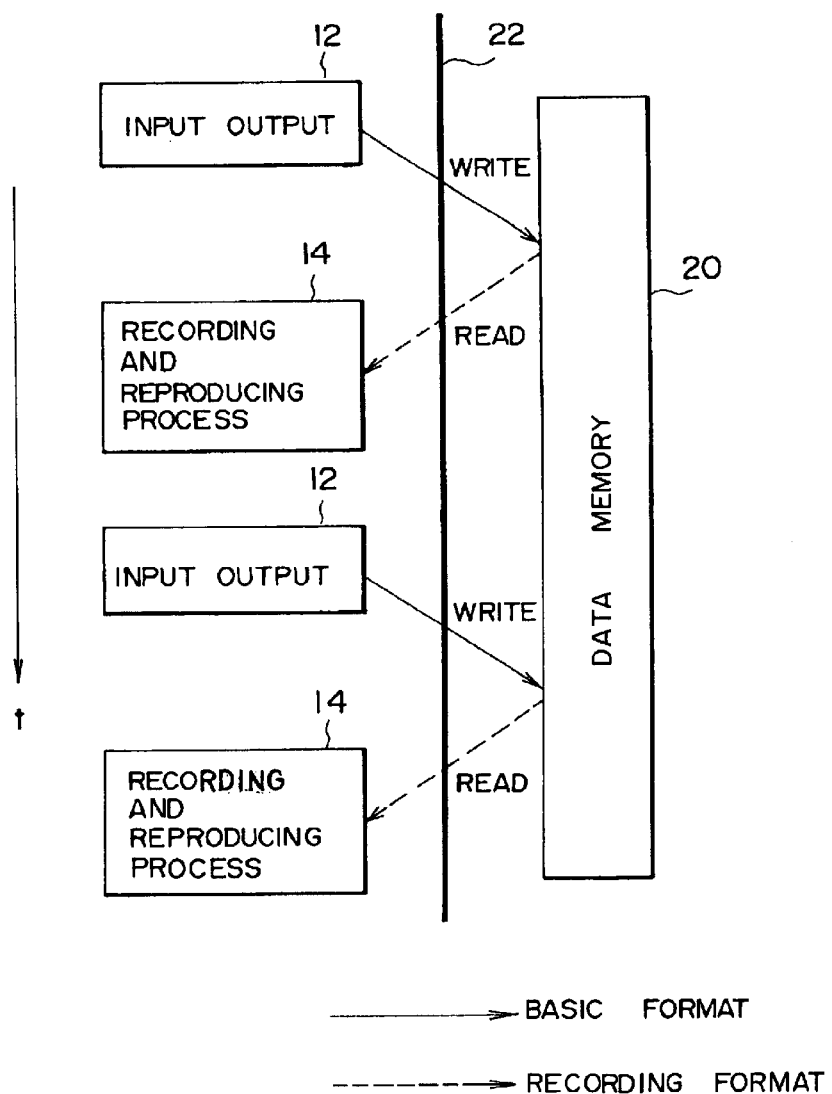
FIG. 6 is a view showing the data flow in said conventional configuration.

As will be apparent from the comparison of the data flow of the present embodiment shown in FIG. 4 and that of the conventional configuration shown in FIG. 6, the access rate in the buses 32, 38 of the present embodiment can be made lower than that in the conventional bus 22. Also the memory address control can be simplified, since the data in each bus have a unified format.

Although the foregoing description has been limited to the digital VCR, the present invention is likewise applicable to an optical file system or a data transmission apparatus.

As will be easily understood from the foregoing, the present embodiment allows to reduct the access rate to the memory or to the data bus, thereby easily realizing an image processing apparatus capable of real-time processing. Also since the data in each bus have a unified format, the address control of memory can be simplified, and the magnitude of the circuits can be reduced.

2nd Embodiment

In the following there will be explained a 2nd embodiment of the present invention, with reference to the attached drawings.

Figure 7:
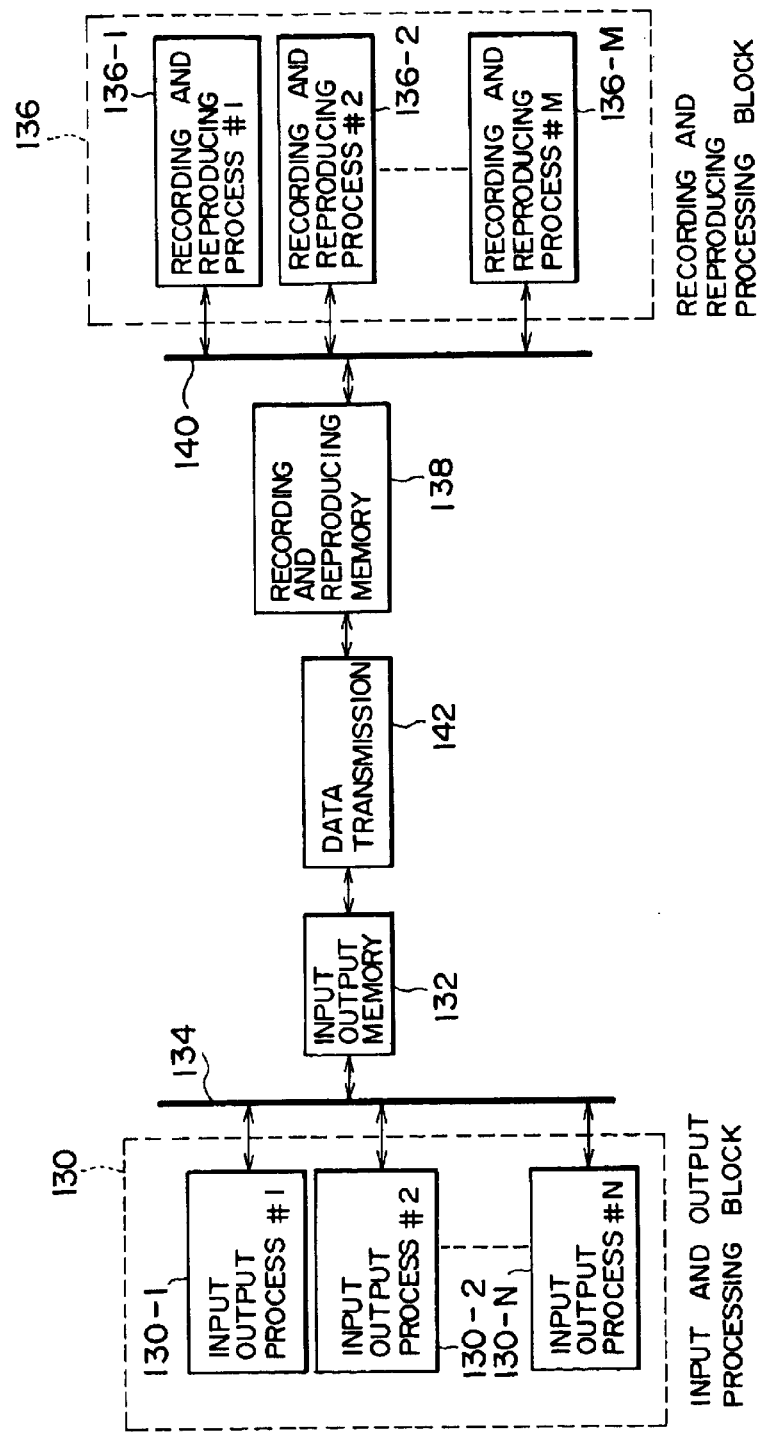
FIG. 7 is a block diagram showing the basic structure of a second embodiment of the present invention.

FIG. 7 is a block diagram showing the basic structure of a second embodiment of the present invention, applied to a digital VCR. An input/output process block 130 is composed of plural circuits 130-1, 130-2, . . . , 130-N for processing image data with the basic format. An input/output memory 32 for effecting input/output of data in the basic format with said input/output process block 130 through a data bus 134, connecting the circuits 130-1, 130-2, . . . , 130-N of the input/output process block 130 with the input/output memory 132.

A record/reproducing process block 136 is composed of plural circuits 136-1, 136-2, . . . , 136-M for effecting record/reproducing of image data in the recording format. A record/reproducing memory 138 effects input/output of the data in the recording format with said record/reproducing process block 136 through a data bus 140, connecting the circuits 136-1, 136-2, . . . , 136-M of said block 136 with the record/reproducing memory 138.

Figure 2A:
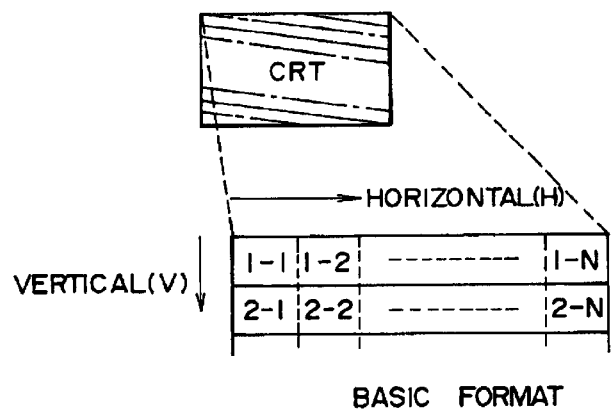
FIGS. 2A and 2B are views showing two examples of transmission format.
Figure 2B:
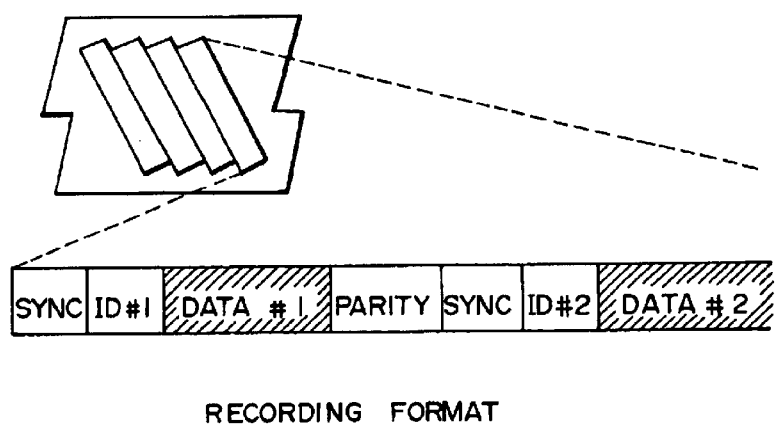

The input/output memory 132 and the record/reproducing memory 138 are connected by a data transfer circuit 142, which generates readout addresses for the input/output memory 132 and write-in addresses for the record/reproducing memory 138 in mutually related manner thereby transferring the data from the input/output memory 132 to the record/reproducing memory 138 and storing said data in said memory 138 in the recording format, and generates read-out addresses for the record/reproducing memory 138 and write-in addresses for the input/output memory 132 in mutually related manner thereby transferring the data from the record/reproducing memory 138 to the input/output memory 132 and storing said data in said memory 132 in the basic format. The format conversion is conducted in this manner. Said recording format and basic format are mutually related as shown in FIGS. 2A and 2B.

Figure 8:
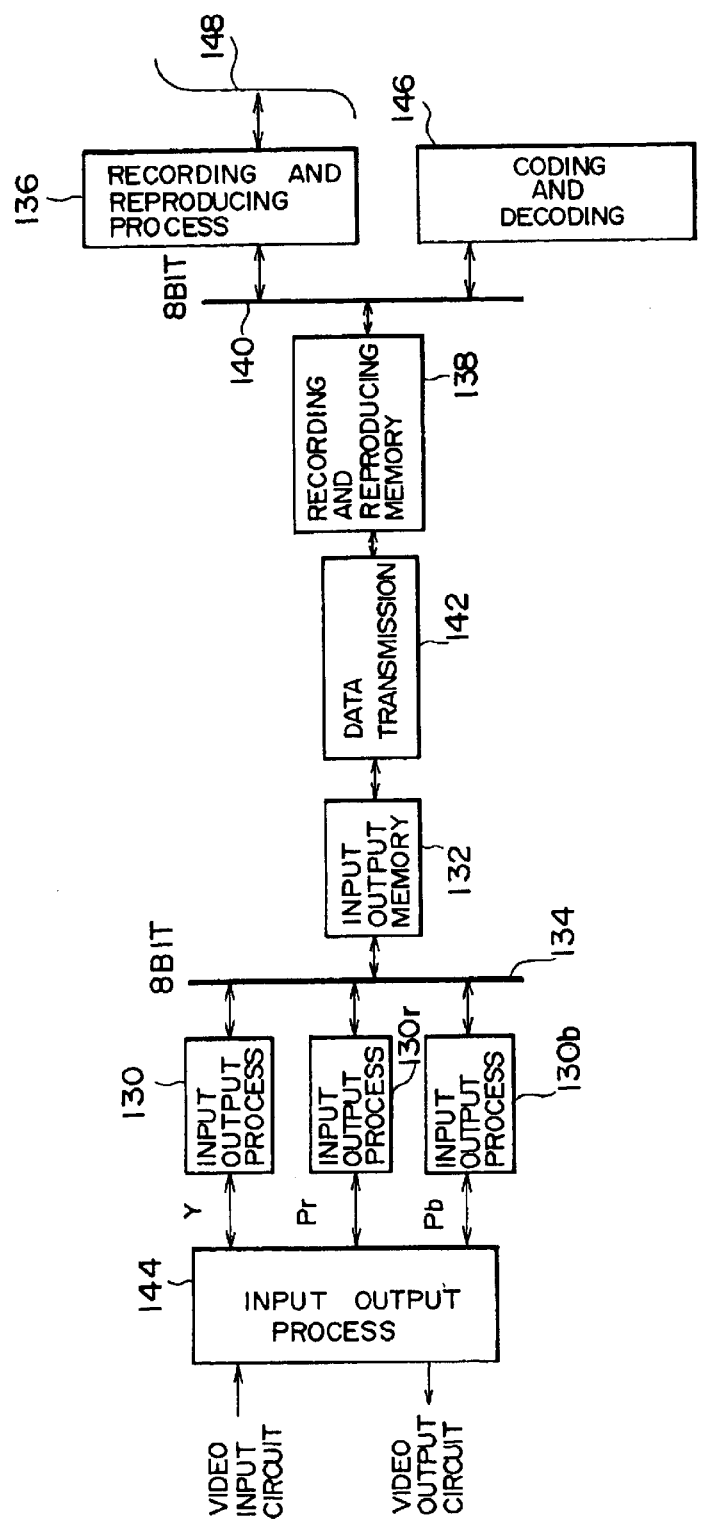
FIG. 8 is a schematic block diagram of a digital VCR incorporating the embodiment shown in FIG. 7.

FIG. 8 is a block diagram showing the basic configuration of a digital VCR in which the embodiment shown in FIG. 7 is applied, wherein same components as those in FIG. 7 are represented by same numbers. There are also shown input/output process circuits 130r, 130b for effecting input/output process on color signals; an input/output process circuit 144 for converting an input video signal into a luminance signal Y and color signals Pr, Pb and for converting input Y, Pb, Pr signal into a signal for example suitable for monitor display; an error correction encoding/decoding circuit 146 for correcting the errors involved in the recording and reproduction; and a magnetic tape 148 constituting a recording medium.

In the recording operation, the luminance signal Y and color signals Pr, Pb in analog form, released from the input/output process circuit 144, are converted into digital form and encoded respectively by the input/output process circuits 130, 130r, 130b, of which digital output is recorded in the input/output memory 132 through the data bus 134, in the data sequence of the basic format. Data shuffling is conducted on the input/output memory 132, if necessary. Then, at a predetermined timing, the data transfer circuit 142 reads the data stored in the input/output memory 132 and transfers said data to the record/reproducing memory 138, in which said data are stored in the data sequence of the recording format.

The encoding/decoding circuit 146 makes access to the record/reproducing memory 138 through the data bus 140 and effects error correction encoding on the data memory 120. After said error correction encoding, the record/reproducing process circuit 136 reads the data from the record/reproducing memory 138 in the data sequence of the recording format, then adds a synchronization code SYNC and an identification code ID, effects a predetermined modulation and records the data in the magnetic tape 148.

Figure 9:
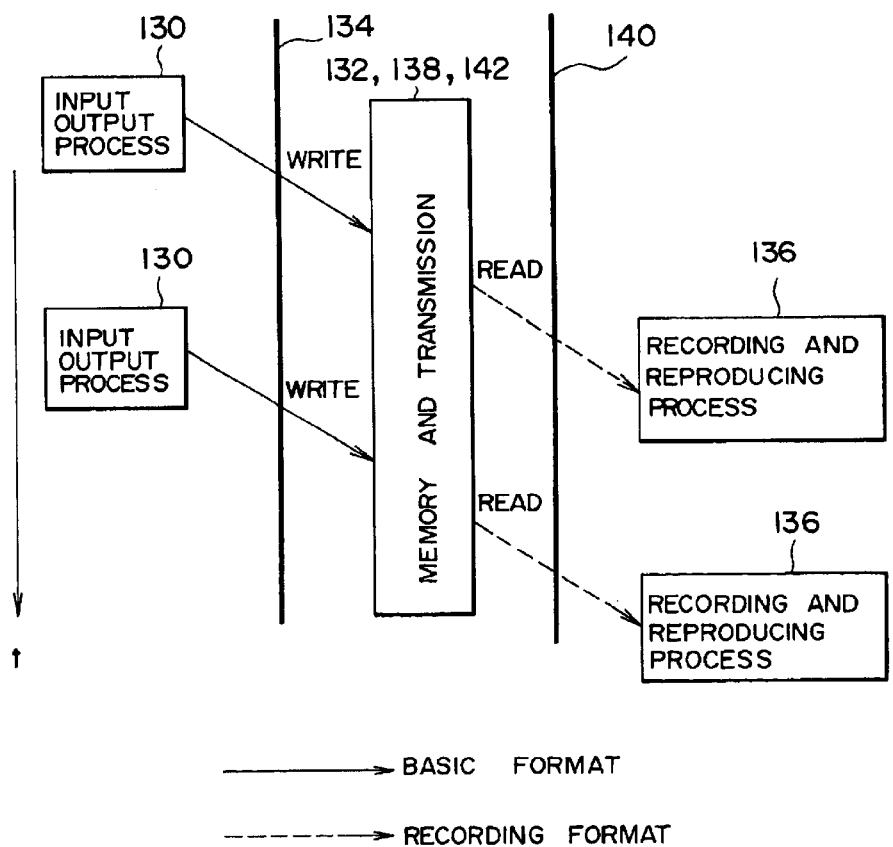
FIG. 9 is a view showing the data flow in a recording operation of the digital VCR shown in FIG. 7.

FIG. 9 shows the format of the data from the input/output process circuits 130, 130r, 130b to the data bus 134 and that from the data bus 140 to the record/reproducing process circuit 136, in relation to time t. In the present embodiment, the input/output process circuit 130 and the circuits 130r, 130b have different data input/output rates according to the difference in signal bandwidth. More specifically, the luminance signal has a wider signal bandwidth than that of the Pr, Pb signals. This fact facilitates the data writing into the memory through the data bus 134.

The reproducing operation is conducted in the following manner. The record/reproducing process circuit 136 effects a reproduction process, according to the recording format, on the data reproduced from the magnetic tape 148, and, according to the synchronization code SYNC and identification code ID of said data, writes the reproduced data into the record/reproducing memory 138 through the data bus 140. The encoding/decoding circuit 146 makes access to the record/reproducing memory 138 through the data bus 140 and effects error correction on said memory 138, by the error correction code applied at the recording. Then the data transfer circuit 142 reads the data present in the record/reproducing memory 138 and stores said data in the input/output memory 132 in the basic format. If data shuffling is conducted at the recording, the data are stored in the input/output memory 132 in the shuffled data sequence, and are converted into the basic format by address operations. Otherwise said data are read in the basic format at the read-out operation to the data bus 134. Subsequently the image data stored in the input/output memory 132 are read to the data bus 134 in the data sequence of the basic format, then converted into an analog signal by the input/output circuit 130 and supplied through the input/output circuit 144 to an external monitor or the like.

As will be apparent from the comparison of the data flow of the present embodiment shown in FIG. 9 and that of the conventional configuration shown in FIG. 6, the access rate in the buses 134, 140 of the present embodiment can be made lower than that in the conventional bus 22. Also the memory address control can be simplified, since the data in each bus have a unified format.

Figure 10:
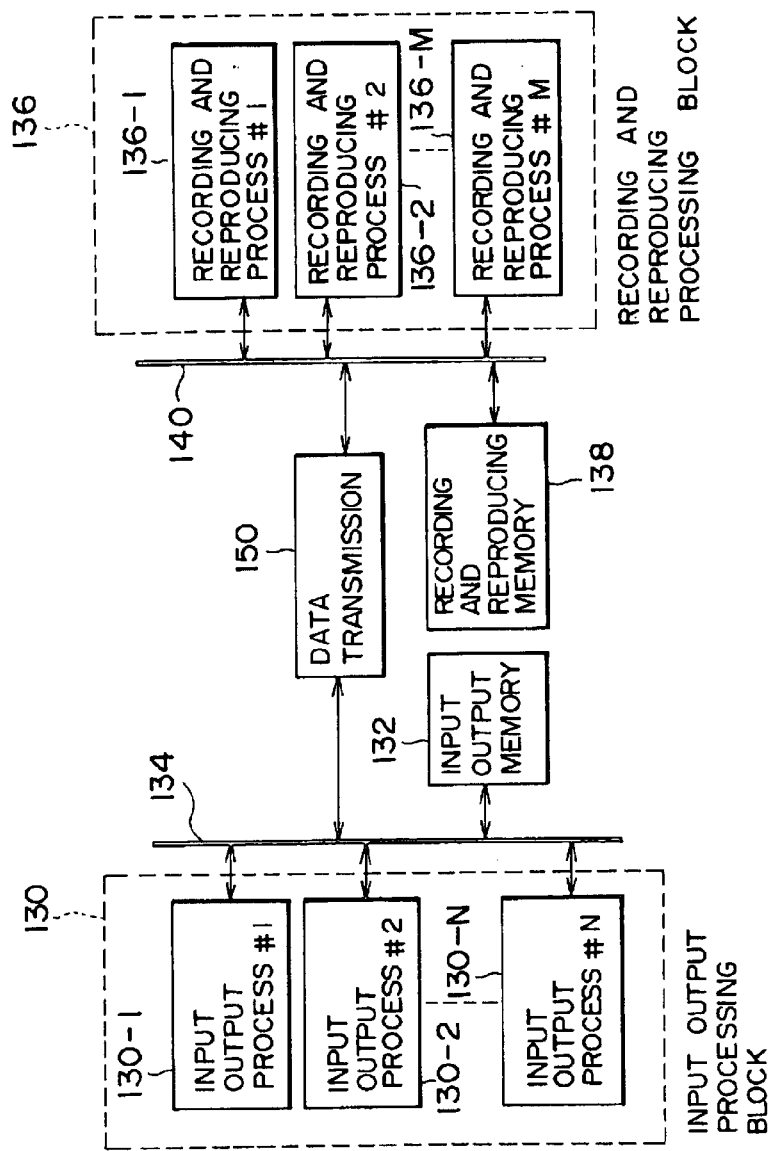
FIG. 10 is a block diagram of a variation of the embodiment shown in FIG. 7.

In the embodiment shown in FIGS. 7 and 8, the data transfer circuit 142 is provided between two memories 132, 138, but said data transfer circuit may be provided between the buses 134, 140. FIG. 10 is a block diagram of such variation, in which same components as those in FIG. 7 are represented by same numbers. In this variation, a data transfer circuit 150 makes access to the input/output memory 132 through the data bus 134 and to the record/reproducing memory 138 through the data bus 140, and effects format conversion by data transfer from the memory 132 to 138 or from 138 to 132.

Also the configuration shown in FIG. 10 allows to reduce the access rates for the memory and bus and to simplify the memory address control. It is also possible, as a mixture of the configurations shown in FIGS. 7 and 10, to connect the data transfer circuit to one of the memories 132, 138 through the bus and directly to the other.

Though the foregoing embodiment has been limited to a digital image recording apparatus, the present invention is not limited to such embodiment and is likewise applicable to other apparatus such as an optical filing apparatus or an image transmission apparatus.

As will be easily understood from the foregoing description, the present embodiment allows to reduce the access rate of the memories and data buses. Also since the data in each bus have a unified format, there is obtained an advantage of simplifying the memory address control and thereby reducing the magnitude of circuitry.

3rd Embodiment

Figure 11:
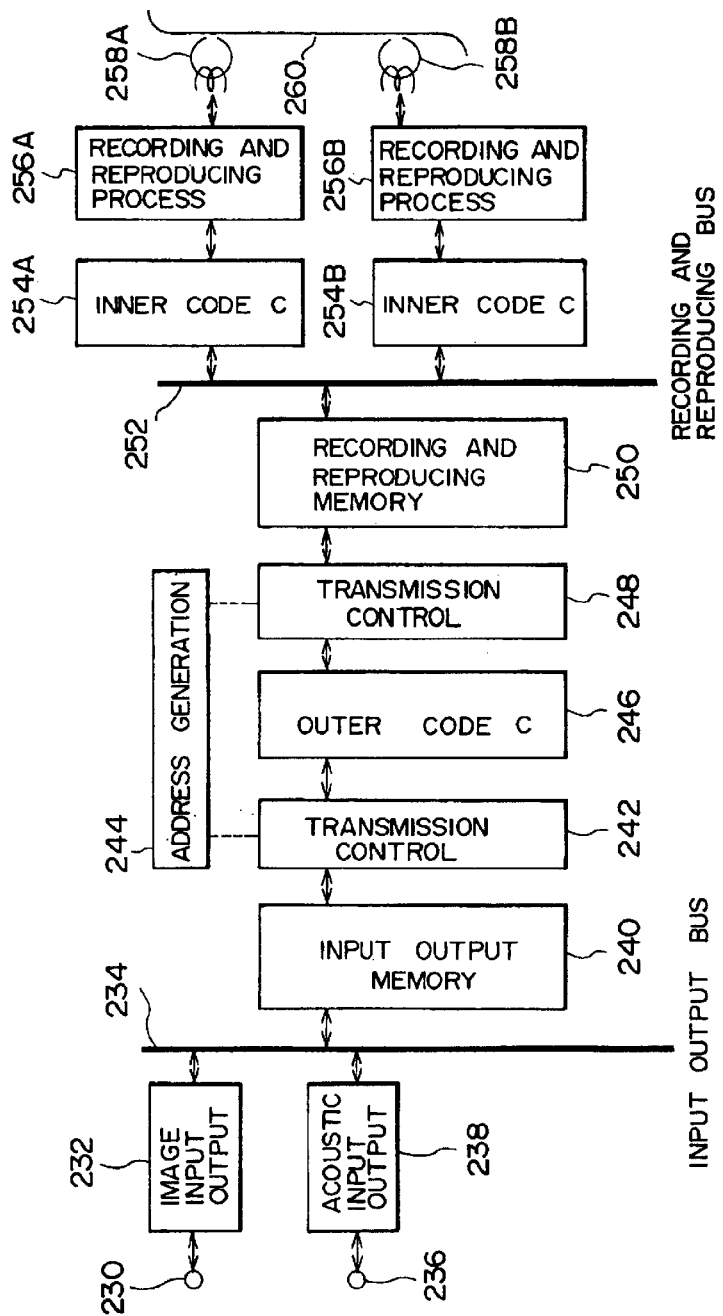
FIG. 11 is a schematic block diagram of a third embodiment of the present invention.
Figure 12A:
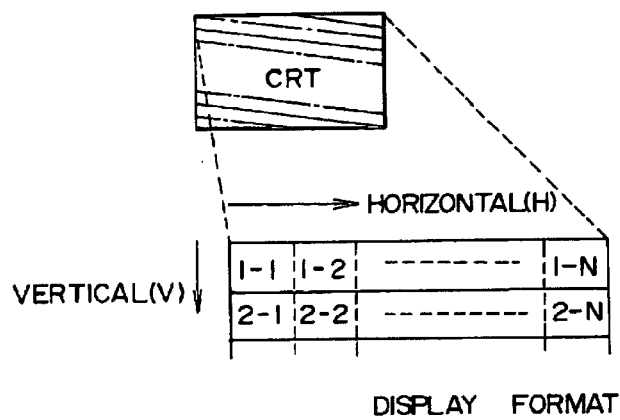
FIGS. 12A and 12B are views showing two Transmission formats employed in the embodiment shown in FIG. 1.
Figure 12B:
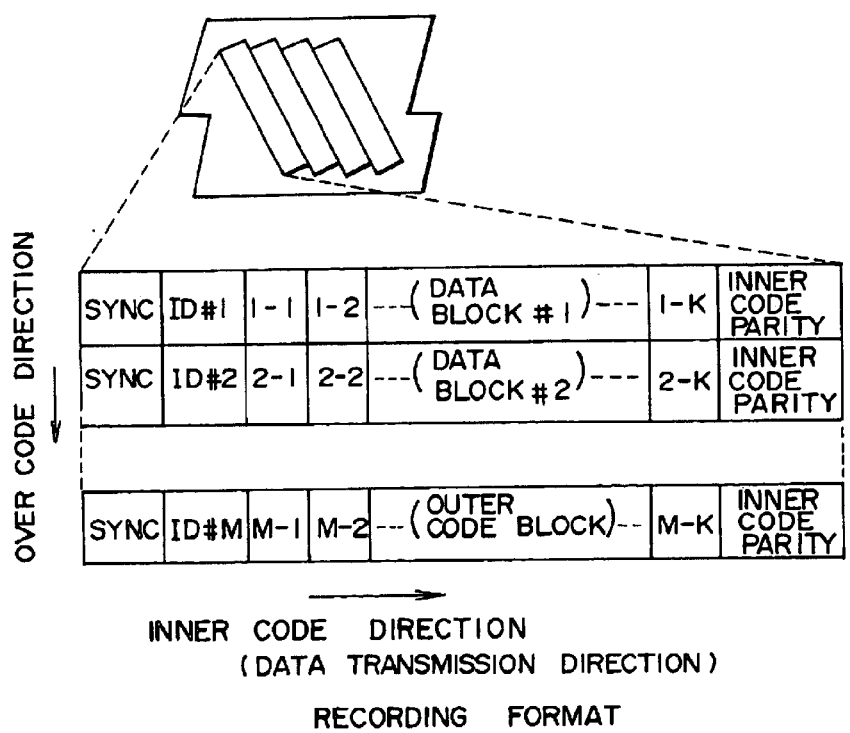

FIG. 11 is a block diagram showing the basic structure of a third embodiment of the present invention, applied to a digital VCR. In the present embodiment, as shown in FIG. 12B, ail inner code is added to the data of a track in the recording format on the magnetic tape, in the recording direction of said data, and an outer code is added in the perpendicular direction.

An analog image signal, entering from an image input/output terminal 230, is subjected to an input process such as conversion to an 8-bit digital signal and band limiting by a spatial filter in an image input/output circuit 232, and is supplied to an input/output bus 234. At the same time, an analog acoustic signal, entering from an acoustic input/output terminal 236, is converted into a 16-bit digital signal by an acoustic input/output circuit 238 and supplied to the input/output bus 234.

The input/output bus 234 is for example a 16-bit bidirectional data bus, and the image data from the image input/output circuit 232 and the acoustic data from the acoustic input/output circuit 238 are recorded in an input/output memory 240 through said bus 234, at a suitable timing by handshake communication. The following description is principally directed to the processing of image data.

The input/output memory 240 is composed of a 2-port memory with a capacity of two fields, which can be alternately assigned for data writing and reading by upper addresses for specifying said fields. Such address control enables data writing and reading at the same time. Also an interleaving process at the recording and a deinterleaving process at the reproduction are conducted by address operations of said input/output memory 240, in order to suppress the number of errors in the reproduced image, even in case of a burst error in the record/reproducing system.

The address operations of said input/output memory 240 are conducted in the following manner. When image data of a frame are stored in the input/output memory 240 along the direction of raster scanning, an address generation circuit 244 sends an address to a transfer control circuit 242 to read the data stored in said memory 240. The data readout is however conducted, not in the direction of raster scanning, as in the display format shown in FIG. 12A , but in a direction perpendicular to the direction of raster scanning. The obtained data are subjected to the addition of an outer parity code in an outer-code encoding/decoding circuit 246, of which output data are stored in a record/reproducing memory 250 by a transfer control circuit 248 according to an address received from the address generation circuit 244. Said encoding/decoding circuit 246 is provided with a buffer memory of a predetermined capacity required for encoding/decoding process. The address generation circuit 244 supplies the transfer control circuit 242 with an address for facilitating the encoding in the outer code direction of the recording format shown in FIG. 12B, and also provides the transfer control circuit 248 with a readout address for reading said recording format, including the outer parity code, in the inner code direction.

Thus the transfer control circuit 242 provides the input/output memory 240 with the read-out address from the address generation circuit 244 and a read-out timing signal corresponding to said read-out address, whereby the image data stored in the input/output memory 240 are read in the sequence of outer encoding in the recording format shown in FIG. 2B, and supplied to the outer-code encoding/decoding circuit 246 through said transfer control circuit 242. Said encoding/decoding circuit 246 calculates the outer code by a known error correction code, such as Reed-Solomon code, adds the obtained parity to the image data from the transfer control circuit 242 and sends the obtained data to the transfer control circuit 248. Said transfer control circuit 248 sends the data train from the encoding/decoding circuit 246 to the data input port of the record/reproducing memory 250, also supplies said memory 250 with the address signal from the address generation circuit 244, as the write-in address, and also with a write-in timing signal, whereby the image data with the added outer parity code are recorded in the record/reproducing memory 250.

The record/reproducing memory 250 is composed also of a 2-port memory. In the present embodiment, the image data of a field are recorded over six tracks with data scramble, and, corresponding to this recording format, said memory 250 has a capacity of (3×2) tracks. The data stored in said memory 250 are read in the inner code direction shown in FIG. 12B, in synchronization with clock pulses of the recording process system, and supplied through the record/reproducing bus 252 to an inner-code encoding/decoding circuits 254A, 254B. The write-in and read-out addresses are switched with an offset corresponding to one track, in order to absorb the jitter component of the recording system.

In the present embodiment, the record tracks on the magnetic tape 260 are alternately formed by two magnetic heads 258A, 258B of different azimuth angles, so that the encoding/decoding circuits 254A, 254B, record/reproducing process circuits 256A, 256B and magnetic heads 258A, 258B are constructed in two channels. Said encoding/decoding circuits 254A, 254B calculate inner codes, add the obtained parity to the input data and send the obtained data to the record/reproducing circuits 256A, 256B, which add a synchronization code SYNC and an identification code ID according to the recording format and effect modulation suitable for magnetic recording. The outputs of said circuits 256A, 256B are respectively supplied to the magnetic heads 258A, 258B to effect recording on the magnetic tape 260.

The reproducing operations are conducted in the following manner. The record/reproducing process circuits 256A, 256B demodulate the signals, reproduced from the magnetic tape 260 by the magnetic heads 258A, 258B, and detect the synchronization codes SYNC and identification codes ID. The inner-code encoding/decoding circuits 254A, 254B calculate syndrome, thereby identifying the position and magnitude of error, and correct the error in the unit of inner code block. The error-corrected data are stored in the record/reproducing memory 250 through the bus 252.

The data stored in said record/reproducing memory 250 are read in the encoding direction of outer code, according to the addresses generated by the address generation circuit 244 and the read-out timing signals from the transfer control circuit 248, and supplied, through said transfer control circuit 248, to the outer-code encoding/decoding circuit 246, which calculates the syndrome, identifies the position and magnitude of error and effects error correction in a similar manner as in the case of inner codes. The error-corrected data are supplied through the transfer control circuit 242 to the input/output memory 240 and stored therein according to the addresses generated by the address generation circuit 244.

The data stored in said input/output memory 240 are read to the bus 234 with deinterleaving by address operations, and the image data and the acoustic data are respectively supplied to the image input/output circuit 232 and the acoustic input/output circuit 238, which, through predetermined output processes, supply respectively the image input/output terminal 230 and the acoustic input/output terminal 236 with an analog reproduced image signal and an analog reproduced acoustic signal.

In the above-explained embodiment, the encoding and decoding of error correction codes are conducted in the data transfer between the memories 240 and 250, but the present invention is naturally not limited to such embodiment and may employ, for example, a high-efficiency encoding utilizing the correlation between different data transmitting directions. Also the outer codes alone are added in the data transfer between the memories 240 and 250, but the present invention is not limited to such embodiment and may be so constructed as to add both the outer and inner codes. Also the plural input/output circuits connected to the input/output bus 234 are respectively assigned for image signal and acoustic signal, but there may also be employed other input/output circuits, for example for luminance signal and color signals.

The foregoing description has been limited to a digital VCR, but the present invention is not limited to such embodiment and is likewise applicable to other apparatus such as an optical filing apparatus or an image data transmission apparatus.

As will be easily understandable from the foregoing description, the present embodiment can achieve complex process such as multiple encoding and decoding, without an increase in the access rate of the memories and data buses. It can also easily absorb the difference in transfer rate among different transmission formats.

What is claimed is:

1. An image recording apparatus, comprising:
    a first data bus, adapted to transfer digital image data of a scanning format according to an order of scanning on an image frame;
    a first memory, connected to said first data bus, adapted to store the digital image data of the scanning format, said first memory inhibiting digital image data of a recording format for recording of the digital image data on a recording medium from being written into and read from said first memory through said first data bus;
    an input device, connected to said first data bus, adapted to input digital image data of the scanning format and store the input digital image data into said first memory through said first data bus;
    a second data bus, separate from said first data bus, adapted to transfer digital image data of the recording format;
    a second memory, connected to said second data bus, adapted to store the digital image data of the recording format, said second memory inhibiting the digital image data of the scanning format from being written into and read from said second memory through said second data bus;
    a data transmitter, connected to said first data bus and said second data bus, adapted to read the digital image data of the scanning format from said first memory through said first data bus, convert the scanning format of the digital image data read out from said first memory to provide converted digital image data of the recording format, and transmit the converted digital image data of the recording format to said second memory through said second data bus, said data transmitter also being adapted to read the digital image data of the recording format from said second memory through said second data bus, convert the recording format of the digital image data read out from said second memory to provide converted digital image data of the scanning format, and transmit the converted digital image data of the scanning format to said first memory through said first data bus; and
    a recorder, connected to said second data bus, adapted to read the digital image data of the recording format from said second memory through said second data bus and to record the read digital image data of the recording format on the recording medium.

2. An apparatus according to claim 1, wherein said data transmitter includes a digital image data coder, adapted to code the digital image data of the scanning format read out from said first memory to provide the first converted digital image data of the recording format.

3. An apparatus according to claim 2, wherein said digital image data coder includes an error correction encoder.

4. An apparatus according to claim 2, wherein said digital image data coder includes a high efficiency encoder.

5. An apparatus according to claim 2, wherein said data transmitter includes a decoder, adapted to decode the digital image data of the recording format read out from said second memory to provide decoded digital image data as the second converted digital image data of the scanning format.

6. An apparatus according to claim 5, wherein said decoder includes an error correction code decoder.

7. An apparatus according to claim 5, wherein said decoder includes a high efficiency decoder.

8. An apparatus according to claim 1, wherein said data transmitter includes an address controller, adapted to control reading addresses and writing addresses of said first memory and said second memory.

9. An apparatus according to claim 1, wherein said first memory has a larger storage capacity than said second memory.

10. An image processing apparatus for processing digital image data using a first memory and a second memory, comprising:
    a first data bus, adapted to transfer digital image data of a first format according to an order of scanning on an image frame, said first memory being connected to said first data bus and being adapted to store the digital image data of the first format, said first memory inhibiting digital image data of a second format for recording of the digital image data on a recording medium from being written into and read from said first memory through said first data bus;
    an input device, connected to said first data bus, adapted to input digital image data of the first format and write the input image data of the first format into said first memory through said first data bus;
    a second data bus, separate from said first data bus, adapted to transfer digital image data of a second format, said second memory being connected to said second data bus and being adapted to store the digital image data of the second format, said second memory inhibiting the digital image data of the first format from being written into and read from said second memory through said second data bus;
    a data transmitter, connected to said first data bus and said second data bus, adapted to read the digital image data of the first format from said first memory through said first data bus, convert the first format of the digital image data read out from said first memory to provide converted digital image data of the second format, and transmit the converted digital image data of the second format to said second memory through said second data bus, said data transmitter also being adapted to read the digital image data of the second format from said second memory through said second data bus, convert the second format of the digital image data read out from said second memory to provide converted digital image data of the first format, and transmit the converted digital image data of the first format to said first memory through said first data bus; and an output device, connected to said second data bus, adapted to read the digital image data of the second format from said second memory through said second data bus and to output the read digital image data of the second format so that the digital image data of the second format are recorded on a recording medium.

11. An apparatus according to claim 10, wherein said data transmitter includes a digital image data coder, adapted to code the digital image data of the first format read out from said first memory to provide coded digital image data as the converted digital image data of the first format.

12. An apparatus according to claim 11, wherein said coder includes an error correction encoder.

13. An apparatus according to claim 11, wherein said coder includes a high efficiency encoder.

14. An apparatus according to claim 11, wherein said data transmitter includes a decoder, adapted to decode the digital image data of the second format read out from said second memory to provide a decoded digital image data as the converted digital image data of the first format.

15. An apparatus according to claim 14, wherein said decoder includes an error correction code decoder.

16. An apparatus according to claim 14, wherein said decoder includes a high efficiency decoder.

17. An apparatus according to claim 10, wherein said data transmitter includes an address controller, adapted to control reading addresses and writing addresses of the first memory and the second memory.

18. An image processing apparatus comprising:

a first data bus, adapted to transfer digital image data of a first format according to an order of scanning on an image frame;

a first memory, connected to said first data bus, adapted to store the digital image data of the first format, said first memory inhibiting digital image data of a second format for recording of the digital image data on a recording medium from being written into and read from said first memory through said first data bus;

a second data bus, separate from said first data bus, adapted to transfer digital image data of the second format;

a second memory, connected to said second data bus, adapted to store the digital image data of the second format, said second memory inhibiting the digital image data of the first format from being written into and read from said second memory through said second data bus;

a data reproducer, connected to said second data bus, adapted to reproduce digital image data of the second format from a recording medium and to write the reproduced digital image of the second format into said second memory through said second data bus;

a data transmitter, connected to said first data bus and said second data bus, adapted to read the digital image data of the second format from said second memory through said second data bus, convert the second format of the digital image data read out from said second memory to provide converted digital image data of the first format, and transmit the converted digital image data of the first format to said first memory through said first data bus, said data transmitter also being adapted to read the digital image data of the first format from said first memory through said first data bus, convert the first format of the digital image data read out from said first memory to provide converted digital image data of the second format, and transmit the converted digital image data of the second format to said second memory through said second data bus; and an output device, connected to said first data bus, adapted to read the digital image data of the first format from said first memory through said first data bus and output the read digital image data of the first format to outside of said apparatus.

* * * * *

UNITED STATES PATENT AND TRADEMARK OFFICE
CERTIFICATE OF CORRECTION

PATENT NO. : 6,718,122 B1
DATED : April 6, 2004
INVENTOR(S) : Ishii et al.

It is certified that error appears in the above-identified patent and that said Letters Patent is hereby corrected as shown below:

Title page,
Item [*] Notice, delete "37 days" to -- 0 days --.

Signed and Sealed this

Twenty-second Day of March, 2005

JON W. DUDAS
*Director of the United States Patent and Trademark Office*